US007597178B2

(12) United States Patent
Dennis et al.

(10) Patent No.: US 7,597,178 B2
(45) Date of Patent: Oct. 6, 2009

(54) CALIPER BRAKE

(75) Inventors: Brian P. Dennis, Kalamazoo, MI (US);
Kenneth A. Dodd, Dowagiac, MI (US);
Norman D. Crawford, Saint Joseph, MI (US); Peter J. Pozivilko, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 12/151,287

(22) Filed: May 6, 2008

(65) Prior Publication Data

US 2008/0296103 A1  Dec. 4, 2008

Related U.S. Application Data

(60) Provisional application No. 60/932,572, filed on May 31, 2007.

(51) Int. Cl.
*F16D 55/228* (2006.01)
(52) U.S. Cl. .................................... 188/72.4; 188/73.44
(58) Field of Classification Search ...... 188/72.1–73.47
See application file for complete search history.

(56) References Cited

U.S. PATENT DOCUMENTS

| 3,800,923 | A | * | 4/1974 | Rike | 188/73.34 |
| 3,862,674 | A | * | 1/1975 | Vananrooy et al. | 188/73.45 |
| 5,620,064 | A | * | 4/1997 | Sano | 188/73.44 |
| 6,092,631 | A | * | 7/2000 | Matsuzaki et al. | 188/72.5 |
| 2002/0166736 | A1 | * | 11/2002 | Yunba | 188/72.5 |

(Continued)

FOREIGN PATENT DOCUMENTS

DE        2557700      *   6/1977

(Continued)

OTHER PUBLICATIONS

Drawing No. 31271 (1 sheet) Ausco Products, Inc. Benton Harbor Michigan.

(Continued)

*Primary Examiner*—Christopher P Schwartz
(74) *Attorney, Agent, or Firm*—Renner, Kenner, Greive, Bobak, Taylor & Weber

(57) ABSTRACT

A hydraulic caliper brake includes a housing formed by two halves. A pair of bores are provided in each housing half, and a piston is positioned in each bore. An end cap closes off each bore and is sealed by an O-ring positioned around the periphery of each end cap. A ring retains each end cap within each bore. Each housing half has a pair of holes aligned with the holes of the other half. A pair of recessed areas are located on opposing ends of the housing, one of the recessed areas being positioned adjacent to one housing half and the other being positioned adjacent to the other housing half. A pair of stator plates each have a first ear with an outer shape having a flattened area positioned within one of said recessed areas in said housing, and a second ear with a continuously curved outer shape. Each ear has a hole therethrough aligned with the holes of the housing halves, and a pin is positioned in the aligned holes. An easily bleedable fluid network supplies fluid to the pistons.

9 Claims, 5 Drawing Sheets

U.S. PATENT DOCUMENTS

2004/0216967 A1* 11/2004 Veneziano et al. ......... 188/72.5
2005/0211508 A1*  9/2005 Roupp ....................... 188/72.5

FOREIGN PATENT DOCUMENTS

| EP | 1 256 740 A | 11/2002 |
| GB | 909251 | 1/1959 |
| GB | 915741 | 1/1959 |
| GB | 1387833 | 3/1975 |
| JP | 11 230205 | 8/1999 |
| WO | WO 2004/011819 | 2/2004 |

OTHER PUBLICATIONS

Drawing No. 81430 (1 sheet) Ausco Products, Inc. Benton Harbor Michigan.
Drawing No. 31766 (2 sheets) Ausco Products, Inc. Benton Harbor Michigan.
520 Series Caliper Disc Brake, Mico, Incorporated, North Mankato, Minnesota (1 page).
M4 Series Service Brakes, Carlisle Industrial Brake & Friction, Bloomington, Indiana (2 pages).
H6 Series Service Brakes, Carlisle Industrial Brake & Friction, Bloomington, Indiana (2 pages).

* cited by examiner

CALIPER BRAKE

This application claims priority of U.S. provisional Application No. 60/932,572 filed May 31, 2007, which is incorporated herein by reference.

TECHNICAL FIELD

This invention relates to a brake. More specifically, this invention relates to an improved caliper style brake having piston bores enclosed by removable end caps, an improved bleed system, and an improved stator assembly.

BACKGROUND ART

Caliper style brakes include one or more stators having friction plates adhered thereto. These stators selectively engage a rotor positioned adjacent thereto to cause a braking force to be applied. Often the stators are caused to move by one or more pistons that are actuated upon introduction of a pressurized fluid, such as oil.

In addition, a though bore is often formed through the caliper housing. The bore is then covered at one end by a plate that is secured to the housing with a plurality of seals. A gasket is positioned between the plate and the housing to prevent oil leakage during use. This design encounters several drawbacks, for example, the plate is susceptible to deflection. Further, leaks often occur between the plate and the housing.

Prior art piston operated braking systems also encounter drawbacks due to inadequate or inefficient fluid transmission arrangements. Often multiple input and output ports are required to supply pressurized brake fluid and allow for the bleeding of air.

In view of these problems, it is evident that the need exists for a brake which may be easy to assemble, prevents leaks and includes a single input and output port for multiple pistons.

DISCLOSURE OF THE INVENTION

It is thus an object of one aspect of the present invention to provide a hydraulic caliper brake with an improved and reliable liquid seal in the through bores.

It is an object of another aspect of the present invention to provide a hydraulic caliper brake with a mechanism to ensure proper placement of the stators.

It is an object of yet another aspect of the present invention to provide a hydraulic caliper brake with a minimal number of inlet and outlet ports for fluid transmission.

These and other objects of the present invention, as well as the advantages thereof over existing prior art forms, which will become apparent from the description to follow, are accomplished by the improvements hereinafter described and claimed.

In general a hydraulic caliper brake in accordance with the present invention includes a housing having at least one bore therethrough. An end cap is positioned within the at least one bore and an O-ring is positioned around the periphery of the end cap. A ring retains the end cap within the bore, and a piston is positioned within the at least one bore, the piston being actuated to operate the brake.

In accordance with another aspect of the present invention, a hydraulic caliper brake includes a housing having a first half and a second half. Each housing half has a pair of holes with the holes in the first half being axially aligned with the holes in the second half. A pair of recessed areas are located on opposing ends of the housing, a first of the recessed areas being positioned adjacent the first half of the housing, and a second of the recessed areas being positioned adjacent the second half of the housing. A pair of spaced stators each have a stator plate including a first ear with a continuously curved outer shape positioned within one of the recessed areas in the housing, and a second ear with an outer shape having a flattened area. Each ear has a hole therethrough aligned with said holes in the housing halves, and a pin is slidably positioned through each of said aligned holes.

In accordance with yet another aspect of the present invention, a hydraulic caliper brake includes a housing having a first half and a second half, and a bridge connecting the housing halves. A pair of bores extend through each of the housing halves, each bore having a fluid chamber. A piston is positioned in each fluid chamber. A fluid network supplies fluid to each fluid chamber and includes an inlet port located in one of the housing halves and an outlet port located in the one of said housing halves. A first channel extends through the bridge and is in fluid communication with the inlet port and a first of the chambers. A second channel extends through the bridge and is in fluid communication the outlet port and a second of the chambers. A third channel connects the first and second channels and is in fluid communication with a third and a fourth of the chambers. The third and fourth of the chambers are located in the other of the said housing halves, and the first and second of the fluid chambers are not in direct communication with each other.

A preferred exemplary brake made in accordance with the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
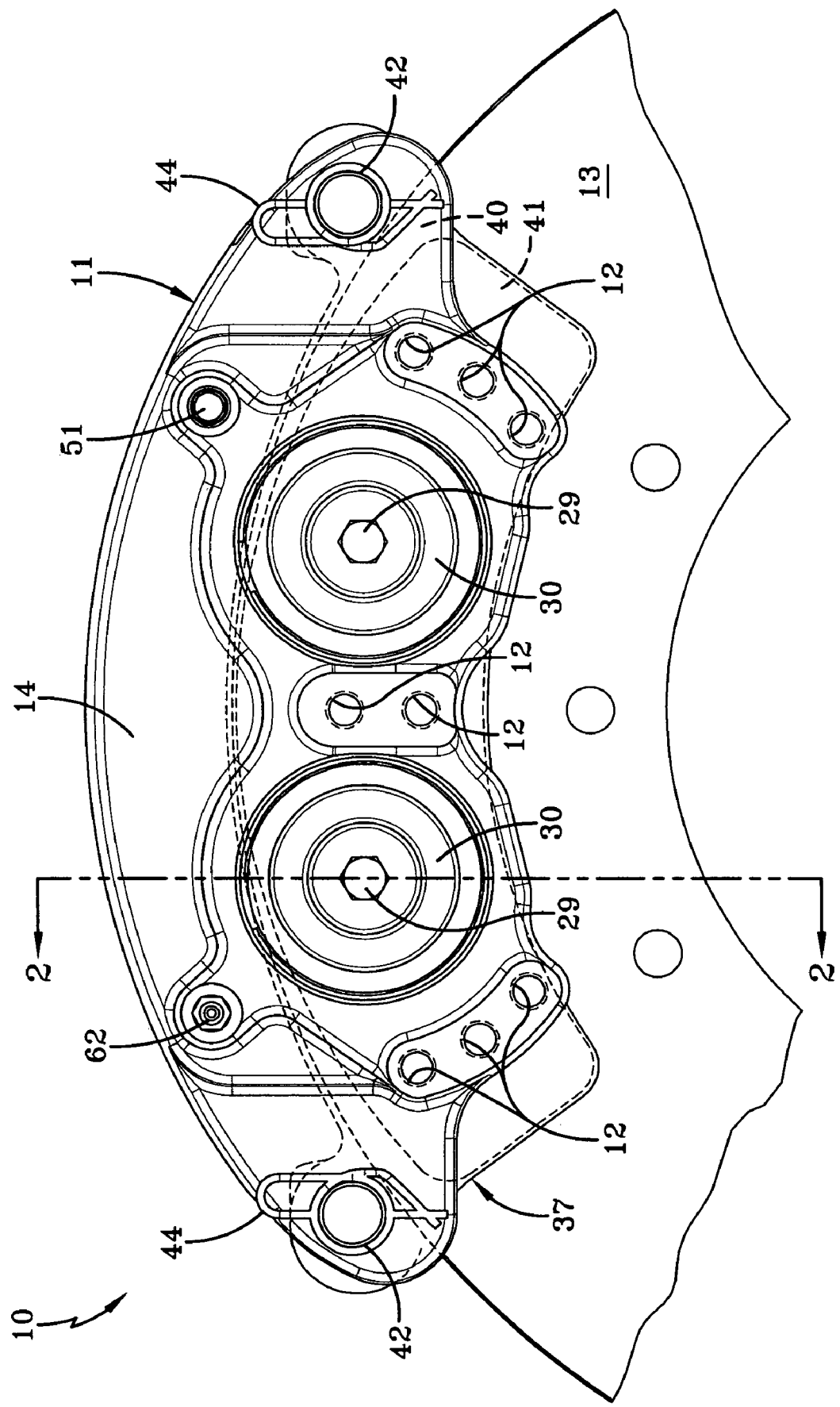
FIG. 1 is an elevational view of a brake assembly made in accordance with the present invention and mounted proximate to a rotor.

A brake made in accordance with the present invention is indicated generally by the numeral 10 and includes a housing 11 that carries and protects the operating components of brake 10. Brake 10 is secured to a machine or vehicle frame by a plurality of bolts (not shown) that are inserted through holes 12 in housing 11. As shown in FIG. 1, brake 10 is positioned over a rotor 13 for selective frictional engagement therewith.

Figure 2:
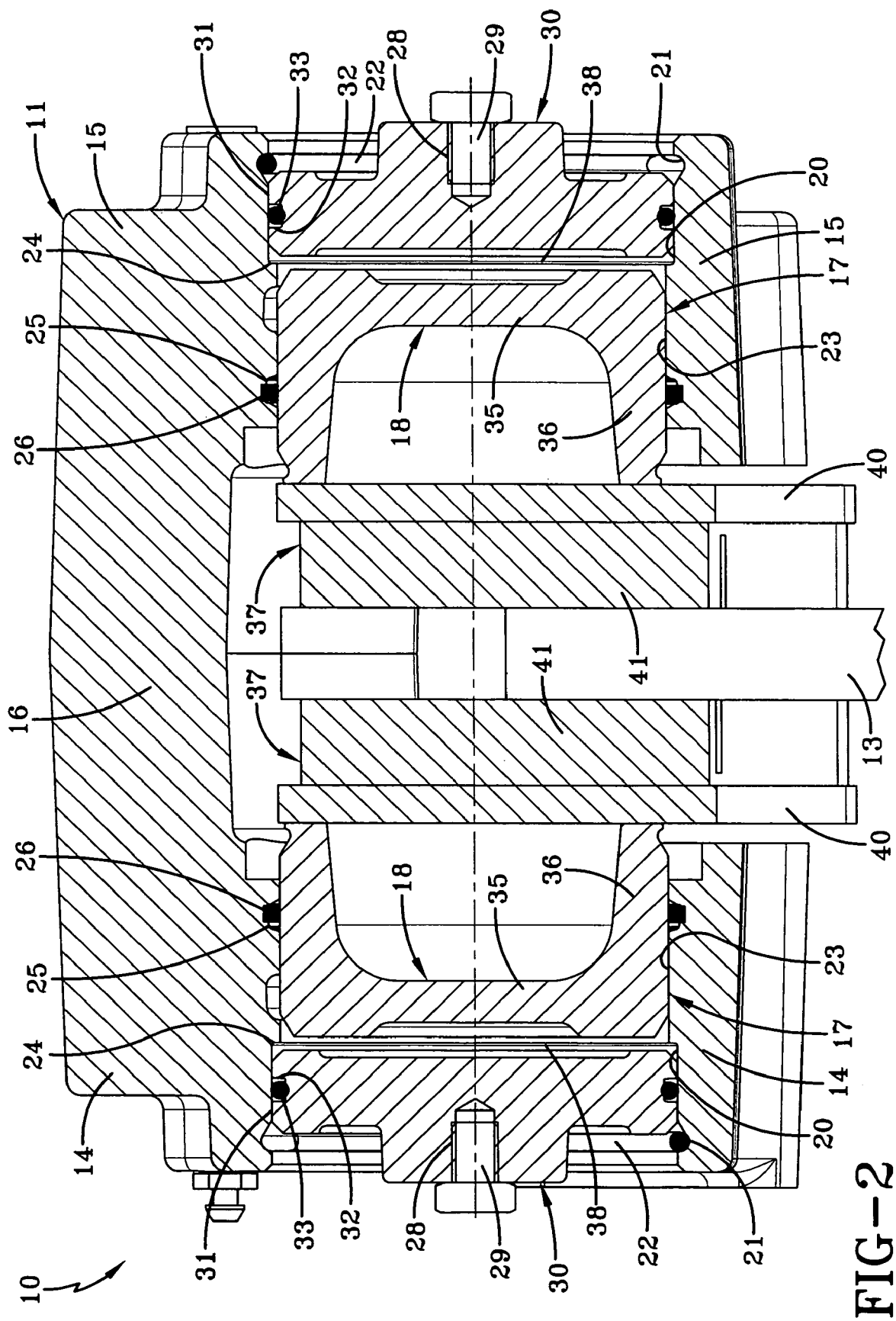
FIG. 2 is a sectional view taken substantially along line 2-2 of FIG. 1.

Referring now to FIG. 2, housing 11 includes a first housing half 14 and a second housing half 15, opposed from first housing half 14. Housing halves 14 and 15 are joined by a bridge 16 so that, in cross-section, housing 11 is generally in the shape of an inverted U. Each housing half 14 and 15 includes a pair of stepped bores 17 that are each adapted to receive a piston 18 therein. It should be appreciated that, though the present embodiment discloses two pistons 18 in each housing half, it is contemplated that each housing half may include just a single piston.

Each stepped bore 17 includes a first circumferential surface 20 on the outward end thereof. First surface 20 includes a circumferential groove 21 that selectively receives a C-ring 22 therein. A second circumferential surface 23 extends inwardly from first circumferential surface 20. Second circumferential surface 23 has a smaller diameter than first circumferential surface 10, thereby forming a ledge 24 at the intersection thereof. Second circumferential surface 23 further includes a circumferential groove 25 that is adapted to receive a seal 26. In one or more embodiments, seal 26 may be annular, with a square cross-section.

A disc shaped end cap 30 is provided in each bore 17 and includes an outer circumferential surface 31 having a diameter slightly smaller than the diameter of first circumferential surface 20. In this manner, end cap 30 is received in first circumferential surface 20 of bore 17 and secured between ledge 24 and C-ring 22. End cap 30 includes a circumferential groove 32 that is adapted to receive an O-ring 33 therein. End cap 30 further includes a threaded bore 28 that receives a screw 29 during normal operation. However, screw 29 may be removed during servicing, allowing a slide hammer to be inserted so that end cap 30 may be pulled out of first circumferential surface 20 of stepped bore 17. This end cap 30 is an improvement over prior designs in that it offers no leak path due to gasket failure, it reduces the possibility of plate deflection, and it saves both time and money because no fasteners are required other than the C-ring to secure end cap 30 in place.

Each piston 18 may be generally cup shaped with a rear, disc shaped body 35 and a circumferentially extending flange 36. Pistons 18 are axially movable within bore 17 to selectively apply pressure to stator assemblies 37. Piston movement is caused by the introduction of pressurized fluid into the chamber 38 formed between end cap 30 and body 35. As is evident from FIG. 2, O-rings 33 prevent the escape of operating fluid from between end cap 30 and first circumferential surface 20. Likewise, seals 26 prevent the escape of operating fluid from between piston 18 and second circumferential surface 23.

Each stator assembly 37 includes a stator plate 40 with a friction material 41 bonded thereto. As shown in FIG. 2, flange 36 of piston 18 engages the surface of stator plate 40 opposed from the friction material 41. Thus, when pressurized fluid is communicated to chambers 38, the opposed stator assemblies 37 are pushed toward each other and engage rotor 13 to cause a braking force to be applied.

Each housing half 14 and 15 includes holes 42 on opposed ends thereof. Each pair of aligned holes 42 receive a pin 43 therein, which is retained by cotter pins 44. Likewise, each stator plate 40 includes opposed thru holes 45 that slidably receive pin 43 therein. In this manner, stator assemblies 37 are carried by pins 44 and are free to slide and transfer the piston force to rotor 13.

Figure 5:
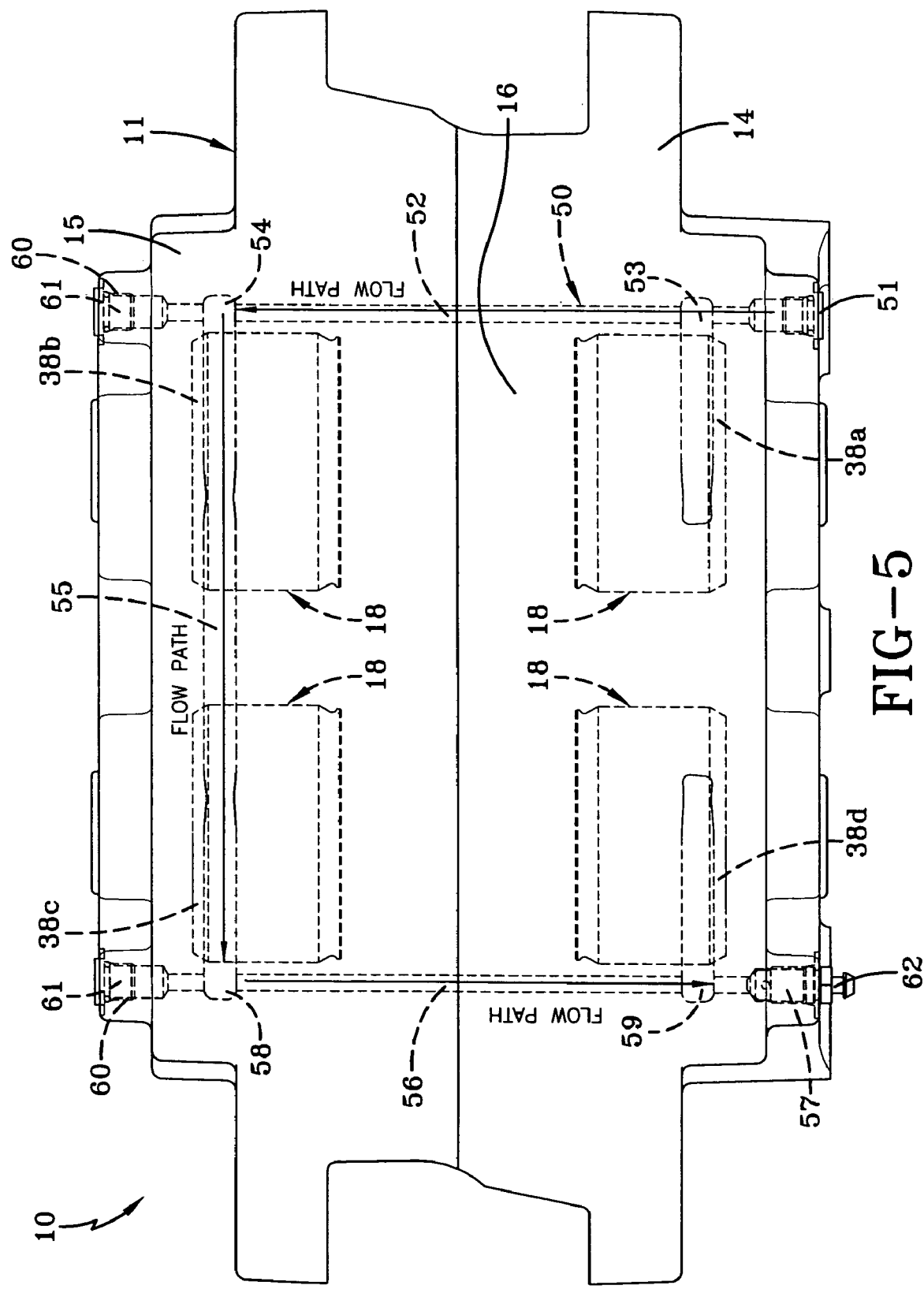
FIG. 5 is a top plan view of the brake assembly showing brake fluid flow path in partial hidden lines.

Referring now to FIGS. 1 and 5, brake 10 includes a brake fluid supply network, indicated generally by the numeral 50. Network 50 includes an input port 51 located at the side face of first housing half 14. Input port 51 is in fluid communication with a first channel 52 that extends through bridge 16 and into second housing half 15. A feed bore 53 extends from first channel 52 and communicates with first chamber 38a. A second feed bore 54 extends from first channel 52 and communicates with second chamber 38b. A cross channel 55 extends perpendicularly from first channel 52 longitudinally along second housing half 15 and terminates at a second channel 56. Second channel 56 extends through bridge 16 back to first housing half and terminates at an output port 57. A third feed bore 58 extends from second channel 56 and communicates with third chamber 38c. A fourth feed bore 59 extends from second channel 56 and communicates with fourth chamber 38d. In this manner, one input port may provide operating fluid to all pistons.

In the present embodiment, second housing half also includes ports 60 that are in communication with first and second channels 52 and 56. Plugs 61 are secured therein to prevent fluid leakage, however, they may also be used to provide additional fluid inputs or outputs.

The present invention may advantageously provide improved bleeding characteristics. Specifically, a bleed plug 62 may be positioned in output port 57 and, during normal brake use, is configured to prevent any leakage of fluids therethrough. However, should the user wish to bleed entrained air from the brake, the user may configure the bleed plug to allow fluid leakage. Thereafter, brake fluid may be forced into the brake through input port 51. Consequently, any air trapped in chamber 38a will be displaced and forced along first channel 52. In a cascading fashion, air from chambers 38b, 38c and 38d will be evacuated of air, leaving only brake fluid therein. Air is evacuated through outlet port 57 until no more entrained air remains. The above configuration provides positive bleeding to all piston chambers from one side of the brake. Further, this forces all air to be bled from the opposing pistons before it reaches the bleed plug 62.

Figure 3:
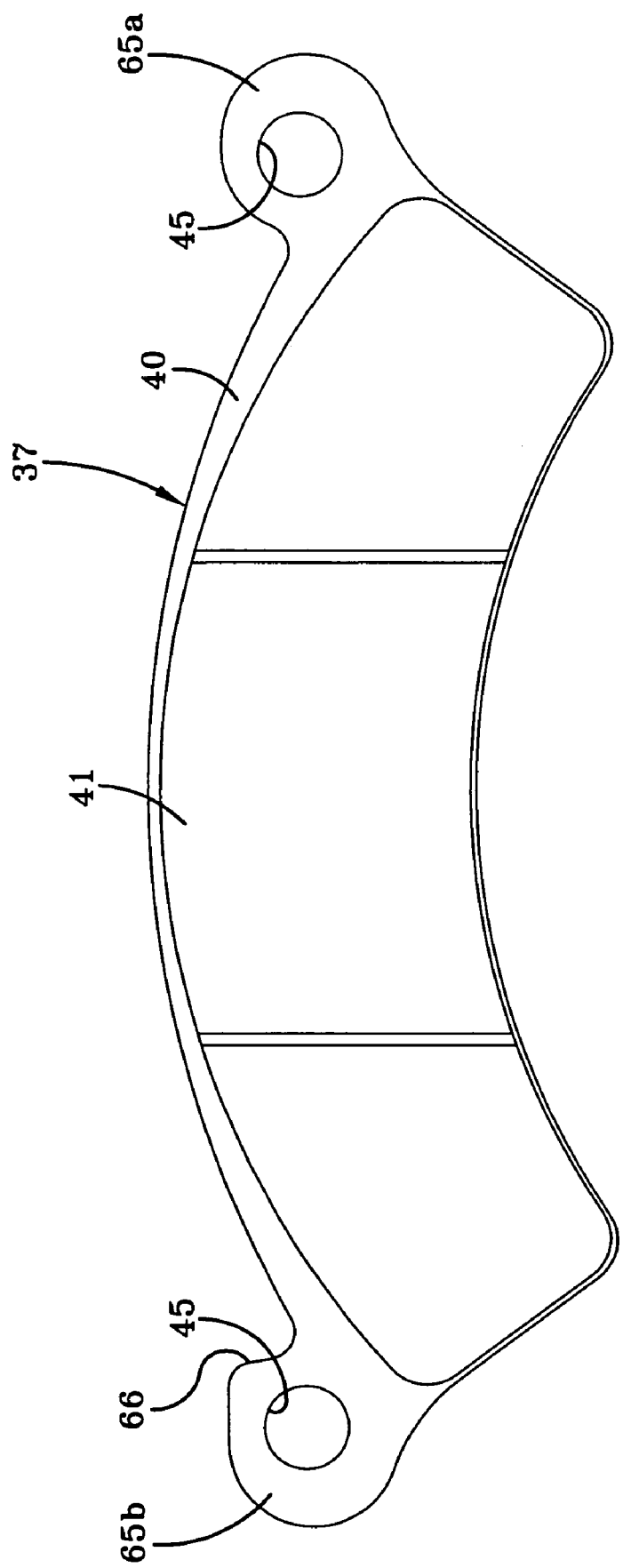
FIG. 3 is an elevational view of the stator.
Figure 4:
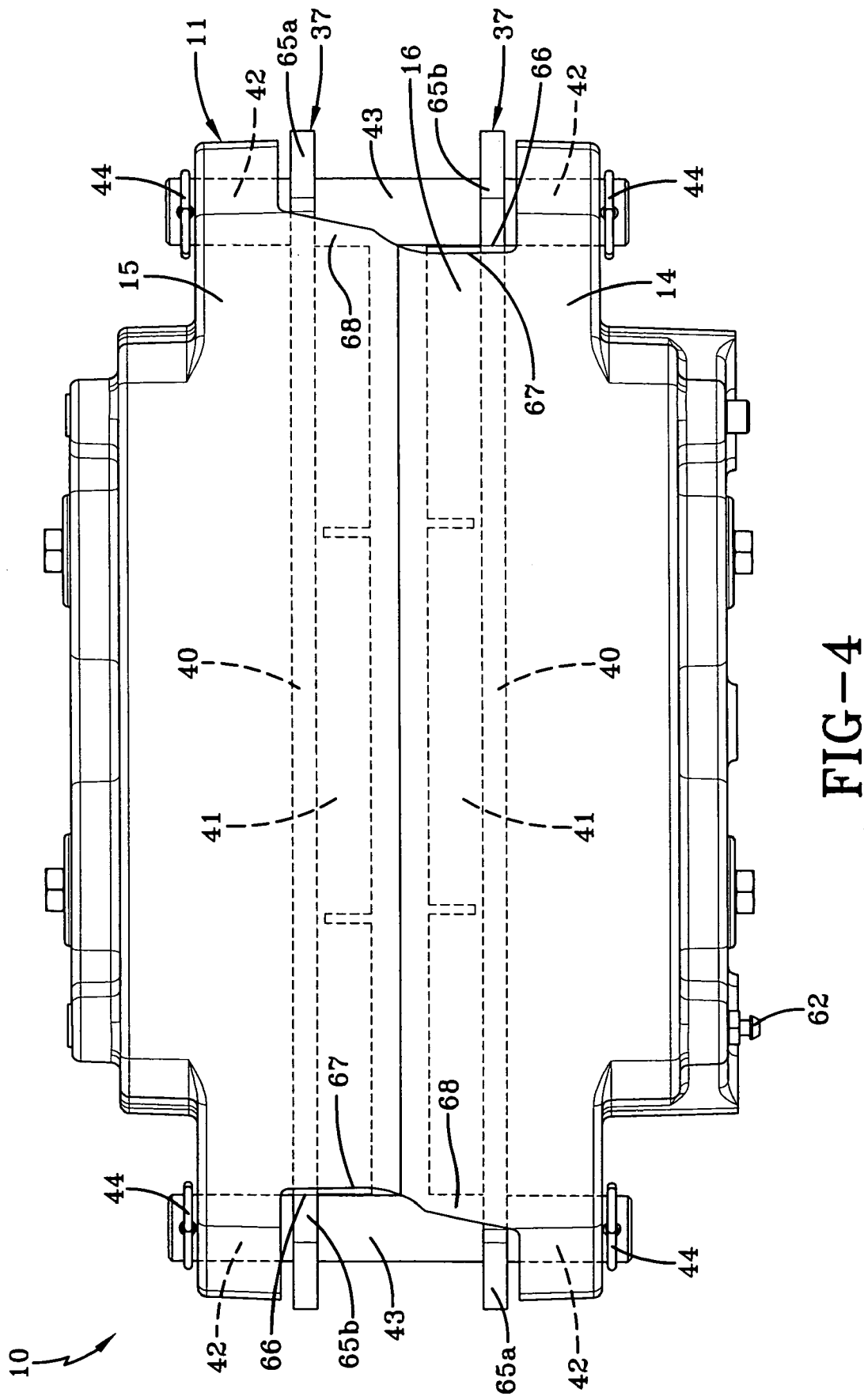
FIG. 4 is a top plan view of the brake assembly showing the brake stator assemblies in partial hidden lines.

Referring now to FIGS. 3 and 4, the present invention may advantageously prevent improper installation of stator assembly 37. Stator plate 40 includes ears 65a and 65b on opposed ends thereof. As can be seen, ear 65a includes a generally rounded, or continuously curved shape. Ear 65b, however, is slightly larger than ear 65a and includes a flattened area 66 at the inner side surface thereof. Likewise bridge 16 includes recessed areas 67 on opposed ends and opposed sides of bridge 16. The recessed areas 67 are shaped such that when a stator assembly 37 is mounted on pin 43, the smaller, rounded, non-flattened ear 65a is positioned in the non-recessed area 68, while the larger, flattened ear 65b is located in the recessed area 67. This requires an installer to locate the stator assemblies 37 in the proper orientation, as the flattened ear 65b is sized to interfere with the non-recessed area 68 to prevent installation if stator assemblies 37 are not in the proper orientation. In this manner, brake damage due to improper installation is prevented.

In view of the foregoing, it should thus be evident that a brake as described herein accomplishes the objects of the present invention and otherwise substantially improves the art.

What is claimed is:

1. A hydraulic caliper brake comprising a housing having a first half, and a second half; a bridge connecting said housing halves; each said housing half having a pair of holes and a pair of bores, an end cap positioned in one end of each of said bores, and a piston positioned within each of said bores, said holes in said first half being axially aligned with said holes in said second half; a fluid chamber in each of said bores; a pair of recessed areas located on opposing ends of said housing, a first of said recessed areas being positioned adjacent said first half of said housing, and a second of said recessed areas being positioned adjacent said second half of said housing; a pair of spaced stators, each having a stator plate including a first ear with an outer shape having a flattened area positioned within one of said recessed areas in said housing, and a second ear with a continuously curved outer shape, each said ear having a hole therethrough aligned with said holes in said housing halves; a pin slidably positioned in each of said aligned holes; and a fluid network supplying fluid to each fluid chamber, said network including an inlet port located in one of said housing halves and an outlet port located in said one of said housing halves, a first channel extending through said bridge and in fluid communication with said inlet port and a first of said chambers, a second channel extending through said bridge and in fluid communication said outlet port and a second of said chambers, a third channel connecting said first and second channels and in fluid communication with a third and a fourth of said chambers, said third and fourth of said chambers being located in the other of said housing halves, said first and second of said fluid chambers not being in direct communication with each other.

2. The hydraulic caliper brake of claim 1, each of said bores including a circumferential groove, and further comprising an annular seal in contact with each said groove and an outer surface of each said piston.

3. The hydraulic caliper brake of claim 1, each said piston having a disc shaped body positioned proximate said end cap and a circumferentially extending flange extending toward, and in contact with, said stator plate.

4. A hydraulic caliper brake comprising a housing having a first half and a second half, each said half having a pair of holes, said holes in said first half being axially aligned with said holes in said second half; a bridge connecting said housing halves; a pair of bores through each of said housing halves, each said bore having a fluid chamber therein; a pair of recessed areas located on opposing ends of said housing, a first of said recessed areas being positioned adjacent said first half of said housing, and a second of said recessed areas being positioned adjacent said second half of said housing; a pair of spaced stators, each having a stator plate including a first ear with an outer shape having a flattened area positioned within one of said recessed areas in said housing, and a second ear with a continuously curved outer shape, each said ear having a hole therethrough aligned with said holes in said housing halves; a pin slidably positioned through each of said aligned holes; and a fluid network supplying fluid to each fluid chamber, said network including an inlet port located in one of said housing halves and an outlet port located in said one of said housing halves, a first channel extending through said bridge and in fluid communication with said inlet port and a first of said chambers, a second channel extending through said bridge and in fluid communication said outlet port and a second of said chambers, a third channel connecting said first and second channels and in fluid communication with a third and a fourth of said chambers, said third and fourth of said chambers being located in the other of said housing halves, said first and second of said fluid chambers not being in direct communication with each other.

5. The hydraulic caliper brake of claim 4, said pins having equal lengths and diameters.

6. The hydraulic caliper brake of claim 5, said pins having a cotter pin inserted therethrough at each end to secure said pins in said holes.

7. A hydraulic caliper brake comprising a housing having a first half and a second half; a bridge connecting said housing halves; a pair of bores through each of said housing halves, each said bore having a fluid chamber therein; a piston in each said fluid chamber; and a fluid network supplying fluid to each said fluid chamber, said network including an inlet port located in one of said housing halves and an outlet port located in said one of said housing halves, a first channel extending through said bridge and in fluid communication with said inlet port and a first of said chambers, a second channel extending through said bridge and in fluid communication said outlet port and a second of said chambers, a third channel connecting said first and second channels and in fluid communication with a third and a fourth of said chambers, said third and fourth of said chambers being located in the other of said housing halves, said first and second of said fluid chambers not being in direct communication with each other.

8. The hydraulic caliper brake of claim 7, said third channel being a cross channel extending in a direction substantially perpendicular to both said first and second channels.

9. A hydraulic caliper brake comprising a housing having a first half and a second half; a bridge connecting said housing halves; a pair of holes in each of said housing halves, said holes in said first half being axially aligned with said holes in said second half; a pair of bores through each of said housing halves; a recessed area located at each end of said housing, a first of said recessed areas being positioned adjacent said first half of said housing, and a second of said recessed areas being positioned adjacent said second half of said housing; a pair of spaced stators each having a stator plate including a first ear with an outer shape having a flattened area positioned within one of said recessed areas in said housing, and a second ear with a continuously curved outer shape, each ear having a hole therethrough aligned with said holes in said housing halves; a pin slidably positioned through said aligned holes; a piston positioned within each of said bores; an end cap positioned within each of said bores; an O-ring positioned around the periphery of each said end cap; a ring to retain each said end cap within said bores; a fluid chamber in each of said bores between said end caps and said pistons; and a fluid network supplying fluid to each fluid chamber, said network including an inlet port located in one of said housing halves and an outlet port located in said one of said housing halves, a first channel extending through said bridge and in fluid communication with said inlet port and a first of said chambers, a second channel extending through said bridge and in fluid communication said outlet port and a second of said chambers, a third channel connecting said first and second channels and in fluid communication with a third and a fourth of said chambers, said third and fourth of said chambers being located in the other of said housing halves, said first and second of said fluid chambers not being in direct communication with each other.

* * * * *